(12) United States Patent
Bacardit

(10) Patent No.: US 6,318,081 B1
(45) Date of Patent: Nov. 20, 2001

(54) HYDRAULIC REACTION MASTER CYLINDER WITH ENHANCED INPUT FORCE

(75) Inventor: Juan Simon Bacardit, Drancy (FR)

(73) Assignee: Bosch Sistemas de Frenado, S.L., Barcelona (ES)

(*) Notice: Subject to any disclaimer, the term of this patent is extended or adjusted under 35 U.S.C. 154(b) by 0 days.

(21) Appl. No.: 09/424,748

(22) PCT Filed: Oct. 19, 1999

(86) PCT No.: PCT/FR99/02536

§ 371 Date: Nov. 29, 1999

§ 102(e) Date: Nov. 29, 1999

(87) PCT Pub. No.: WO00/23308

PCT Pub. Date: Apr. 27, 2000

(30) Foreign Application Priority Data

Oct. 20, 1998 (FR) .................................................. 98 13186

(51) Int. Cl.$^7$ ..................................................... B60T 13/20
(52) U.S. Cl. .................................................................. 60/533
(58) Field of Search ....................................... 60/552, 553

(56) References Cited

U.S. PATENT DOCUMENTS 6,079,208 * 6/2000 Verbo et al. ............................. 60/553

* cited by examiner

Primary Examiner—Edward K. Look
Assistant Examiner—Thomas E. Lazo
(74) Attorney, Agent, or Firm—Leo H. McCormick, Jr.; Warren Comstock

(57) ABSTRACT

The invention relates to a master cylinder with hydraulic reaction, comprising a working chamber (12) in which there slides, under the action of a pushrod (50), a hollow main piston (13) inside which a reaction piston (14), itself moved by a plunger (80), delimits a reaction chamber (15) which communicates with the working chamber (12), a prestressed spring (16) offering resistance to a movement of the reaction piston (14) in the opposite direction (X+X−) from its actuating direction (X−X+).

According to the invention, a sliding ring (18) is arranged opposite the plunger (80) so that actuation of the reaction piston (14) by the plunger (80) is also accompanied by compression of the spring (16).

4 Claims, 2 Drawing Sheets

HYDRAULIC REACTION MASTER CYLINDER WITH ENHANCED INPUT FORCE

The present invention relates in general to hydraulic braking systems for motor vehicles.

More specifically, the present invention relates to a master cylinder with hydraulic reaction of the type which comprise: a cylindrical body pierced with a main axial bore delimiting a variable-volume working chamber filled with brake fluid; a main piston closing the working chamber and sliding selectively in the main bore from a position of rest and in a first axial direction to reduce the volume of this working chamber; a secondary axial bore pierced in the main piston and delimiting a variable-capacity reaction chamber subjected to a variable pressure and communicating with the working chamber; a reaction piston closing the reaction chamber and sliding selectively in the secondary bore from a position of rest and in the first axial direction to reduce the capacity of the reaction chamber; a first actuating member for displacing the main piston from its position of rest; a second actuating member for displacing the reaction piston from its position of rest; a spring that is preloaded in compression, an upstream end of which rests, in the position of rest, on the first actuating member and a downstream end of which rests, in a position of rest, on a stop integral with the main piston, this spring being arranged in the main piston around the reaction piston; and a drive surface defined on the reaction piston for selectively driving the downstream end of the spring in a second axial direction that is the opposite of the first axial direction and correspondingly increasing the compression of the spring.

BACKGROUND OF THE INVENTION

A master cylinder of this type is well known in the prior art and is, for example, incorporated into the braking devices described in patent EP-0,662,894 and patent document FR-2,751,602, such braking devices having the advantage of optimizing the intensity of the braking force in the event of a sharp application of the brakes.

More recently, there has arisen, in the design of new braking systems, a preoccupation with having very fine control over the feeling felt at the pedal by the driver, so as to standardize this feeling as far as possible and allow drivers to change vehicles without having to make any particular effort to adapt to the various braking systems used in various vehicles.

The present invention falls within this context and is intended to provide a master cylinder with hydraulic reaction of simple structure and which offers this feature.

SUMMARY OF THE INVENTION

To this end, the master cylinder of the present invention, which in other respects is in accordance with the generic definition given in the above preamble, is essentially characterized in that it further comprises movement-transmission means allowing the second actuating member to drive the upstream end of the spring along and correspondingly increase the compression of the spring when this second drive member displaces the reaction piston in the first axial direction.

This arrangement thus makes it possible, using one and the same spring, to fulfill two distinct functions namely, on the one hand, offering resistance to a movement of the reaction piston in the opposite direction from its actuating direction and, on the other hand, offering resistance to the displacement, in the actuating direction, of the second actuating member by the driver.

In the preferred embodiment of the invention, the movement-transmission means comprise a sliding ring arranged in the main piston around the reaction piston and inserted between the upstream end of the spring and the first actuating member, this ring being shaped to be driven along by the second actuating member when this second drive member displaces the reaction piston in the first axial direction.

Furthermore, the spring is preferably always in a state of compression such that at least one of its upstream and downstream ends is in its position of rest.

Other features and advantages of the invention will emerge clearly from the description thereof given hereafter with no limitation implied, with reference to the appended drawings.

DETAILED DESCRIPTION OF THE INVENTION

Figure 1:
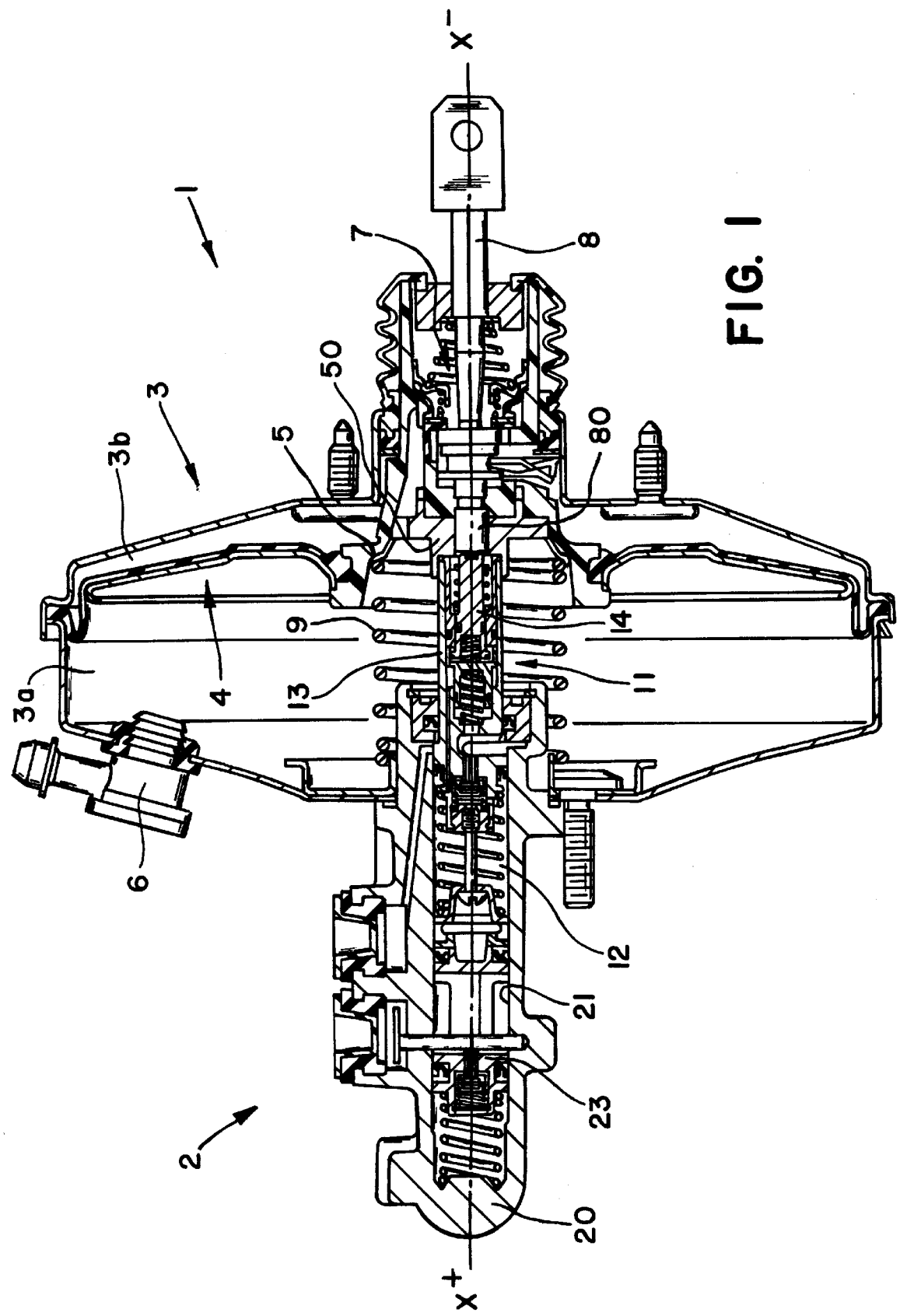
FIG. 1 is a sectional view of a braking device incorporating a master cylinder according to the invention.

The braking device illustrated in FIG. 1, like the one described in the prior patent document FR-2,751,602, schematically comprises a pneumatic brake booster 1 and a master cylinder 2.

The master cylinder 2 essentially comprises a body 20 pierced with a main axial bore 21 in which there slides a piston assembly 11 and a secondary piston 23.

The booster itself comprises a rigid casing 3 split into two chambers 3a and 3b in a leaktight manner by a moving partition 4 capable of driving along a pneumatic piston 5 which can move inside the casing 3.

The front chamber 3a, the front face of which is closed in a leaktight manner by the master cylinder 2, is permanently connected to a source of partial vacuum (not depicted) through a connection 6.

The pressure in the rear chamber 3b is controlled by a pneumatic valve 7 operated by an operating rod 8, which is connected to a brake pedal (not depicted).

When the operating rod 8 is in a position of rest, in this case pulled to the right as illustrated in FIG. 1, the pneumatic valve 7 establishes a communication between the two chambers 3a and 3b of the booster.

As the rear chamber 3b is then subject to the same partial vacuum as the front chamber 3a, the piston 5 is pushed back to the right, in the position of rest, by a spring 9.

Actuating the operating rod 8 to the left has the effect, first of all, of displacing the pneumatic valve 7 in such a way that it isolates one of the chambers 3a and 3b from the other and then, secondly, of displacing this pneumatic valve in such a way that it opens the rear chamber 3b to atmospheric pressure.

The pressure difference across the two chambers, then felt by the moving partition 4 exerts on the latter a thrust which tends to displace it to the left and allow it to drive along the piston 5 which in turn moves, compressing the spring 9.

The braking force exerted on the operating rod 8, or "input force" and the brake-boosting force or "boost force" resulting from the thrust on the moving partition 4 are then applied together in the axial direction X–X+ of the pushrod 8 in the direction of the master cylinder 2 and combine to form the force that actuates the latter.

More specifically, the actuating force is applied to the system assembly 11 of the master cylinder and overall causes a displacement to the left (in FIG. 1) in the axial direction X–X+, which leads to an increase in pressure in the brake fluid present in the working chamber 12 of the master cylinder and to actuation of the brake connected thereto.

The piston assembly 11 is, in fact, composite, and comprises a main piston 13 pierced with an axial bore 130 closed in a leaktight manner by a reaction piston 14.

Figure 2:
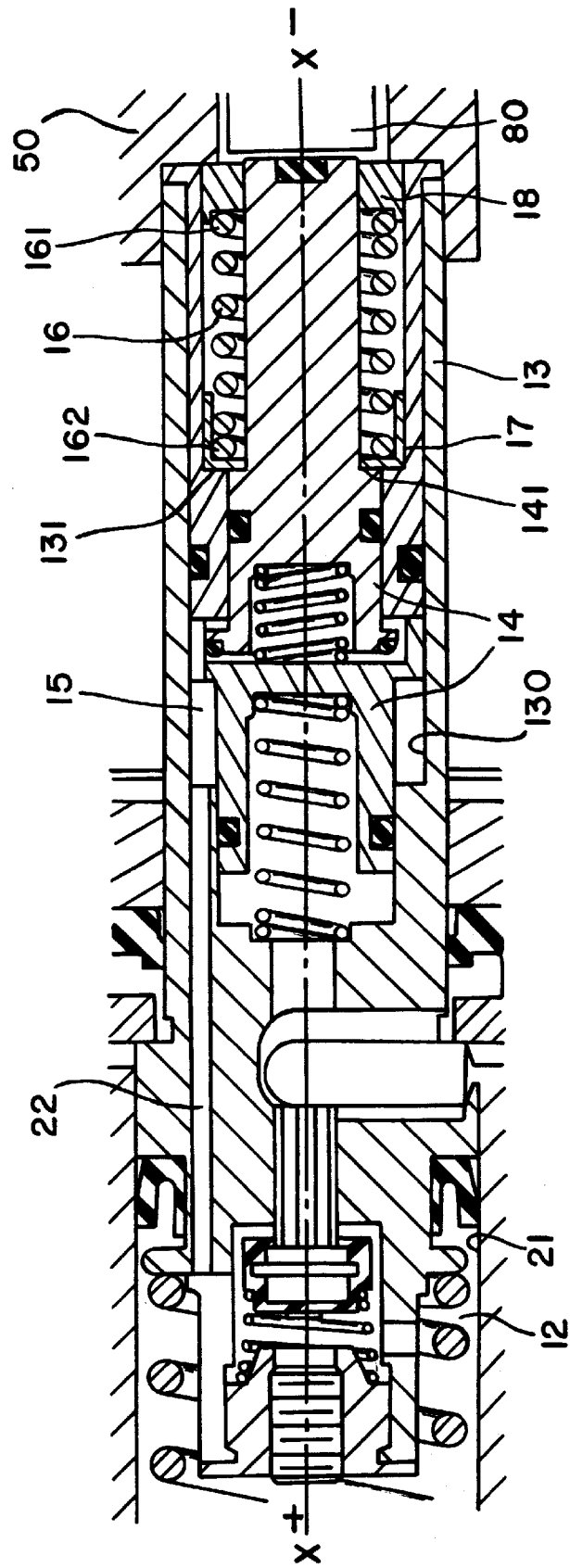
FIG. 2 is a sectional view of the specific members of the master cylinder of the invention.

The working chamber 12 is delimited, in the bore 21 of the body 20, by the main piston 13 which is capable of sliding therein in a leaktight manner from its position of rest illustrated in FIGS. 1 and 2 and in the axial actuating direction X–X+, so as to reduce the volume of this working chamber and increase the hydraulic pressure prevailing therein.

The sliding of the main piston 13 is obtained by the displacement of an annular pushrod 50, which rests on the main piston 13 and is moved itself by the pneumatic piston 5.

The reaction piston 14 delimits, within the bore 130 of the main piston 13, a variable-capacity reaction chamber 15 which communicates with the working chamber 12 at least via a duct 22.

The reaction piston 14 is mounted so that it can slide in leaktight manner in the bore 130 of the main piston 13 from its position of rest illustrated in FIGS. 1 and 2 and in the axial actuating direction X–X+, so as to be able to reduce the capacity of this reaction chamber.

The sliding of the reaction piston 14 is obtained by the displacement of a plunger 80, which is itself moved by the operating rod 8.

A spring 16, preloaded in compression, is arranged in the main piston 13 around the reaction piston 14, an upstream end 161 of this spring 16 resting, in the position of rest, on the pushrod 50, and a downstream end 162 of this spring 16 resting, in the position of rest, on a stop 131 integral with the main piston.

The reaction piston 14 furthermore has a drive surface 141 allowing this reaction piston to drive, possibly via a washer 17, the downstream end 162 of the spring in an axial direction X+X– that is the opposite of the actuating direction X–X+, and correspondingly increase the compression of the spring 16 when an abrupt increase in the hydraulic pressure in the reaction chamber 15 pushes the reaction piston 14 back in this opposite direction X+X–.

The master cylinder of the invention can be distinguished from these known features in that it comprises means allowing the plunger 80 to drive the upstream end 161 of the spring 16 along and correspondingly increase the compression of this spring when the plunger 80 displaces the reaction piston 14 in the actuating direction X–X+.

In the embodiment depicted in FIG. 2, these means consist more specifically of a sliding ring 18 arranged in the main piston 13 around the reaction piston 14 and inserted between the upstream end 161 of the spring 16 and the pushrod 50, this ring 18 being shaped to be driven along by the plunger 80 when the latter displaces the reaction piston 14 in the actuating direction X–X+.

Furthermore, the spring 16 is preferably always in a state of compression such that at least one of its upstream 161 and downstream 162 ends is in its position of rest.

I claim:

1. A master cylinder with hydraulic reaction comprising:

a cylindrical body pierced with a main bore deliminting a variable-volume working chamber filled with brake fluid;

a main piston closing the working chamber and sliding selectively in said main axial bore from a position of rest and in a first axial direction to reduce the volume in said working chamber, said main piston being pierced with a secondary axial bore and deliminting a variable-capacity reaction chamber subjected to a variable pressure and communicating with said working chamber;

a reaction piston closing said reaction chamber and sliding selectively in said secondary axial bore from a position of rest and in a first axial direction to reduce the capacity in said reaction chamber;

a first actuating member for displacing said main piston from its position of rest;

a second actuating member for displacing said reaction piston from its position of rest;

a spring being preloaded in compression having an upstream end which engages said first actuating member and a downstream end which engages a stop integral with said main piston in said position of rest, said spring being arranged in said main piston around said reaction piston, said reaction piston having a drive surface for selectively said down stream end of said spring in a second axial direction that is opposite to said first axial direction and increasing the compression of said spring, said master being characterised by movement-transmission means which allows said second actuating member to drive said upstream end of said spring along and correspondingly increase the compression of said spring when said second actuating member displaces said reaction piston in said first axial direction.

2. The master cylinder according to claim 1 characterised in that said movement-transmission means comprise a sliding ring arranged in said main piston around said reaction piston and being located between said upsteam end of said spring and said first actuating member, said sliding ring being shaped to be driven along by said second actuating member when said second actuating member displaces said reaction piston in said first axial direction.

3. The master cylinder according to claim 2 characterised in that said spring is always in a state of compression and at least one of said upsteam end and said downstream end is in its position of rest.

4. The master cylinder according to claim 1 characterised in that said spring is always in a state of compression and at least one of said upsteam end and said downstream end is in its position of rest.

* * * * *